US011685487B2

(12) United States Patent
Krause et al.

(10) Patent No.: US 11,685,487 B2
(45) Date of Patent: *Jun. 27, 2023

(54) SYSTEMS AND METHODS FOR TREATING A SUBMERGED SURFACE OF A TARGET STRUCTURE (71) Applicants: FLUID IMPACT TECHNOLOGIES CORPORATION, Pointe-Claire (CA); SOFCHEM, Rueil-Malmaison (FR)

(72) Inventors: Hans Juerg Krause, Pointe-Claire (CA); Pierre-Olivier Jost, Rueil-Malmaison (FR)

(73) Assignees: FLUID IMPACT TECHNOLOGIES CORPORATION, Pointe-Claire (CA); SOFCHEM, Rueil-Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,978

(22) Filed: Nov. 30, 2021

(65) Prior Publication Data

US 2022/0161907 A1 May 26, 2022

Related U.S. Application Data (63) Continuation of application No. 17/045,023, filed as application No. PCT/CA2019/050401 on Apr. 3, 2019, now Pat. No. 11,186,349.

(30) Foreign Application Priority Data

Apr. 4, 2018 (CA) .................................. CA 3000249

(51) Int. Cl.
*B63B 59/04* (2006.01)
*B08B 17/02* (2006.01)
(Continued)

(52) U.S. Cl.
CPC .............. *B63B 59/04* (2013.01); *B08B 17/02* (2013.01); *B06B 3/00* (2013.01); *B08B 3/12* (2013.01); *B63B 59/08* (2013.01)

(58) Field of Classification Search
None
See application file for complete search history.

(56) References Cited

U.S. PATENT DOCUMENTS 4,244,749 A 1/1981 Sachs et al.
4,444,146 A 4/1984 Dewitz et al.
(Continued)

FOREIGN PATENT DOCUMENTS

| CN | 206033305 U | 3/2017 |
| DE | 1031166 B | 5/1958 |
| GB | 2446945 A | 8/2008 |

OTHER PUBLICATIONS

Reno, J. et al., Heterodyne I: Enhancing sonochemical efficiency through application of the heterodyne effect: An initial study, Ultrasonics—Sonochemistry 56, p. 143-149, 2019.
(Continued)

Primary Examiner — Nicole Blan
(74) Attorney, Agent, or Firm — BCF LLP (57) ABSTRACT An ultrasonic system for treating a submerged surface of a target structure, the system including: an ultrasonic generator for generating electrical energy to drive first and second ultrasonic transducers, the electrical energy including at least two different frequencies including a first and second operation frequency; first ultrasonic transducers configured to be mounted as a first array to the target structure, and connectable to the ultrasonic generator and operable to generate a first ultrasound signal from the first operation frequency; and second ultrasonic transducers configured to be mounted as a second array to the target structure, and connectable to the ultrasonic generator and operable to (Continued)

generate a second ultrasound signal from the second operation frequency, wherein the first and second ultrasonic transducers are spaceable from one another to produce guided ultrasonic waveforms through the target structure including heterodyned frequencies from the first ultrasound signal and the second ultrasound signal.

19 Claims, 7 Drawing Sheets

(51) Int. Cl.
  *B06B 3/00* (2006.01)
  *B08B 3/12* (2006.01)
  *B63B 59/08* (2006.01)

(56) References Cited

U.S. PATENT DOCUMENTS

| | | |
|---|---|---|
| 5,143,011 A | 9/1992 | Rabbette |
| 5,441,368 A | 8/1995 | Campbell et al. |
| 5,735,226 A | 4/1998 | McNeal |
| 5,889,870 A | 3/1999 | Elwood et al. |
| 6,259,653 B1 | 7/2001 | Courson et al. |
| 6,276,292 B1 | 8/2001 | Soulek |
| 6,285,629 B1 | 9/2001 | Shigihara et al. |
| 6,503,081 B1 | 1/2003 | Feine |
| 2008/0225634 A1 | 9/2008 | Murakami |
| 2010/0195434 A1* | 8/2010 | Menger ................. G01V 1/005 367/16 |
| 2011/0083708 A1* | 4/2011 | Puskas ..................... B08B 3/00 134/113 |
| 2013/0239987 A1 | 9/2013 | Kou |
| 2016/0306040 A1 | 10/2016 | Hunt |
| 2017/0341109 A1 | 11/2017 | Forissier |

OTHER PUBLICATIONS

Baghalian, A. et al., A novel nonlinear acoustic health monitoring approach for detecting loose bolts, Journal of Nondestructive Evaluation 37:24, 2018.

Lugovtsova, Y. et al., Analysis of guided wave propagation in a multi-layered structure in view of structural health monitoring, Applied Sciences, Oct. 29, 2019.

Legg, M. et al., Acoustic methods for biofouling control: A review , Ocean Engineering, vol. 103, p. 237-247, Jan. 1, 2015.

* cited by examiner

SYSTEMS AND METHODS FOR TREATING A SUBMERGED SURFACE OF A TARGET STRUCTURE

RELATED APPLICATIONS

This application is a continuation of U.S. patent application Ser. No. 17/045,023, filed on Oct. 2, 2020, and issued as U.S. Pat. No. 11,186,349 on Nov. 30, 2021, which is a national stage application, filed under 35 U.S.C. § 371, of International Patent Application No. PCT/CA2019/050401, filed on Apr. 3, 2019, which claims priority from Canadian Patent Application No. 3,000,249, filed on Apr. 4, 2018, the entirety of each of which is incorporated herein by reference.

FIELD OF THE TECHNOLOGY

The present technology relates to ultrasonic systems and methods for treating a submerged surface of a target structure. More particularly, the present technology is directed to ultrasonic systems and methods for one or more of: disrupting biofilm, denaturing biofilm, killing biofilm, preventing biofilm, disrupting algae growth, killing algae and/or other marine deposits, detaching algae and/or other marine deposits, preventing growth of algae and/or other marine deposits, for the purposes of cleaning or decontamination of external or internal submerged surfaces of target structures.

BACKGROUND

It is well understood that vessels or large structures that in part reside below the surface of seawater or fresh water are subjected to various levels of biofouling by marine (salt water) or aquatic (fresh water from lakes and rivers) organisms, respectively. Such fouling may start to occur already within hours from immersion of the surface into the water. Therefore, such surfaces require protection and routine removal (cleaning) of fouling such as algae, weed, barnacles, mollusks, etc., in order to maintain the performance or even the function of the object. At the base of the fouling mechanism for vessels and structures residing in the sea or fresh water are the biofilms formed on such structures, which constitute the bonding material between marine or aquatic organisms and the actual structure. The biofilms form first and subsequently fouling-organisms attach to all subsurface structures and as a result the more diverse or intricate or large the structure the more difficult and costly to remove the biofilms and these organisms. Fouling is a major problem, leading to higher fuel consumption for vessels and consequently increased air pollution. It can also cause the spread of alien species that do not belong into a distant local marine environment.

The global economic impact of marine biofouling is very high. For example, in the US Navy, the propeller cleaning is recommended up to six times a year and hull cleaning or grooming is recommended up to three times a year.

At a global level the yearly costs of biofouling, both for extra fuel costs and for prevention and removal activities, is in the order of billions of euros; at the same time, the direct environmental cost is in the order of millions of extra tons of emitted carbon dioxide. A further environmental impact is the transfer of invasive aquatic species into ecosystems, a problem that has grown in significance in recent decades.

Today submerged surfaces are typically protected by hull coatings that repel biofouling, typically containing metallic copper. Such coatings are typically ablating into the sea, annually leading to thousands of tons of toxic materials being added to the marine environment. Moreover, the coatings cannot totally protect against biofouling, and still require periodic hull cleaning. The cleaning or grooming of a marine (salt water) or aquatic (freshwater) vessel or structure generally involves methods that use brushes, scrapers, other abrasive means to clean and very high-pressure water sprays. Abrasive methods can be damaging to the welds and rivets of the water vessels or underwater structures compromising their mechanical integrity. Some of these methods require that the water vessel be dry-docked, which is a not only a large expense but a risk to the structure of the vessel each time it is removed from the water. Present cleaning or grooming methods are labour intensive and fall short of being thorough, often leaving behind the biofilms. These other cleaning methods also tend to remove one or more surface layers of coatings or paint protecting the vessel or platform structure, which may require that it be recoated or repainted. When the cleaning or grooming is performed below water surface another drawback may occur due to the fact that removed coatings or paint from the ship can be toxic to the surrounding marine or aquatic life.

Some solutions have been proposed for the problem of biofouling. For instance, U.S. Patent Application Publication No. 2011/0117294 discloses an apparatus and method for heating target surfaces to a temperature that inhibits, prevents or removes biofouling through induction heating by including an electromagnetic driver and control circuitry for generating electromagnetic energy within a select frequency range to match a target surface. An antenna emits the electromagnetic energy within a focused region to react with atoms/molecules in the target surface, thereby causing the target surface to be heated to a temperature within a controlled range. Increasing temperature disrupts, kills or denatures biofouling organisms, biofilms and organic matter on the target surface and/or denatures biofilms on the surface. Coating materials may be applied to target surfaces to optimize the RF reactive molecular structure. A diagnostics, positioning and temperature sensor circuit communicates with the electromagnetic driver. A feedback circuit is used to maintain power level. Contemplated heating mechanisms include: magnetic hysteresis; dielectric hysteresis; eddy currents; and enhanced skin effect.

As another example, U.S. Pat. No. 8,603,452 discloses a biological hydrogel that is chemically stabilized with non-covalent or covalent cross-links. The biological hydrogel is used to coat surfaces of materials for submersion in marine water. Molecular dissolution at the marine water-hydrogel surface prevents attachment of fouling organisms. The rate of dissolution can be controlled by both the concentration of the biopolymer in the hydrogel and the nature and concentration of cross-linker used. Additional components, either molecular or particulate, can be added to the biological hydrogel before or after cross-linking for enhanced properties.

U.S. Pat. No. 5,866,016 discloses a method and compositions for controlling biofouling using combinations of an ionene polymer and a salt of dodecylamine. The technology relates to a method to inhibit bacteria from adhering to a submergible surface. The method contacts the submergible surface with an ionene polymer and a salt of dodecylamine in a combined amount effective to inhibit bacterial adhesion to the submergible surface. A method for controlling biofouling of an aqueous system is also disclosed. This method adds an ionene polymer and a salt of dodecylamine in a combined amount effective to inhibit bacteria from adhering to a submerged surface within the aqueous system. This method effectively controls biofouling without substantially killing the fouling organisms. Compositions containing an ionene polymer and a salt of dodecylamine useable in the above methods are also disclosed. The compositions comprise an ionene polymer and a salt of dodecylamine in a combined amount effective to inhibit bacteria from adhering to submergible or submerged surfaces.

Moreover in recent years ultrasonic vibration of a hull has become another well-known antifouling method for small, typically recreational vessels. These devices all use low power pulsed bulk mode ultrasound. Bulk mode is similar to a hammer hitting the hull at a very high frequency usually of between 20-40 kHz. The hull vibrates and the energy transfers through the hull into the water. However very little energy travels through the hull within the metal body, which is why this technology suffers from a short effective range of approximately a radius of 4-6 m, possibly explaining why such devices have not yet been accepted by the marine industry to protect large commercial vessels and other large submerged structures.

Another disadvantage of ultrasonic fouling protection is the limited range of species that one system can protect against. The marine species found on submerged surfaces around the world count in the thousands, with varying sizes. Each size of species basically requires a specific ultrasonic frequency to achieve optimal protection and effectiveness. However conventional ultrasound systems all use piezoelectric transducers that are only able to emit one single frequency. Regardless of how many frequencies are sometimes emitted by the ultrasonic tone generator, the piezoelectric transducer unit is only capable of vibrating efficiently on its resonance frequency. Any deviating frequencies will merely result in heat generation, but not in enhanced broad range protection.

Fouling in general has significant economic impact, due both to the direct cost of the relevant activities and to the operational efficiency in terms of increased idle periods for the ships in order to carry these out. Furthermore, there is also additional indirect environmental impact in terms of both the carbon footprint of these activities and the biological waste that is generated. At a global level the annual cost of fouling, both for extra fuel costs and for prevention and removal activities, is in the order of billions of euros. At the same time, the direct environmental cost is in the order of millions of extra tons of emitted carbon dioxide. A further environmental impact is the transfer of invasive aquatic species into ecosystems that may be at great distances from their original habitat, a problem that has grown in significance in recent decades and has become focal point of regulatory organizations worldwide.

None of the previous solutions, taken either individually or in combination, provide an adequate solution to the problem of biofouling, particularly on large structures. It is desired to ameliorate these identified problems and shortcomings.

SUMMARY

In light of certain disadvantages of the prior art, the following summary is provided to facilitate an understanding of some of the innovative features unique to the present technology and is not intended to be a full description. A full appreciation of the various aspects of the technology can be gained by taking the entire specification, claims, drawings, and abstract as a whole.

Certain aspects and embodiments of the present technology provide enhanced treatment or protection systems and methods for preventing or treating biofoulings by many different biological species. For example, in certain embodiments, the prevention or treatment of biofouling of an increased range of species of algae (or other biological biofouling matter) on submerged surfaces of target structures, compared to prior art solutions, is achieved. In certain embodiments, the present technology can prevent and/or treat (clean) biofouling of ship hulls or other large submerged structures.

According to certain aspects and embodiments of the present technology, there is provided the use of high power, continuous ultrasonic waves in a guided wave mode in combination with continuous dual- or multiple frequency vibration. The guided wave mode is antisymmetric in certain embodiments (also called flexural mode). By antisymmetric is meant perpendicular to the surface on which the transducer is mounted (i.e. the plane of the direction of the sound). In certain embodiments, the antisymmetric guided mode can provide the largest vibration in the off-plate direction. In certain embodiments, the guided wave mode reduces energy loss into surrounding waters by channeling the energy to travel inside the object surface membrane, enabling effective antifouling protection over much greater distances.

According to certain aspects and embodiments of the present technology, the super-positioning of two or more frequencies, is excited by two or more distinct transducer units. The result is the effect of heterodyning. Super-positioning of two or more frequencies results in generating about double the amount of the vibration frequencies. No longer does a single frequency vibrate the object surface, but four frequencies, namely both original frequencies plus the sum ($f3=f1+f2$) and difference ($f4=f1-f2$) between the two frequencies. As a result this broadens the number of marine species that the present technology is capable to protect against. Further, by combining (superposing) different frequencies, such as a relatively lower and a relatively higher frequency, the effective range of protection or treatment is increased, due to the lower frequency carrying the superposed high frequency to greater distances than the high frequency would be able to travel as a single frequency wave. By generating two or more distinct or different frequency vibrations in ultrasonic guided wave form, which is optionally antisymmetric, certain embodiments of the present technology achieve a broad range marine fouling species protection combined with long range effectiveness for large structures. Surprisingly, developers of the present technology found that superposing continuous high frequency waves onto high energy waves of lower frequency in guided wave mode, whether antisymmetric or not, provided an effective range of ultrasonic vibration previously unattainable to treat or prevent biofouling of submerged surfaces of target structures, such as watercraft hulls.

According to certain aspects and embodiments of the present technology, there is provided an ultrasonic combination-tone-generator that is able to provide two or more parallel, synchronic frequency outputs. The generator is powered by a power source, such as an electric power source. Two or more outputs are each linked to substantially identical piezoelectric transducers for each frequency. These transducer heads may be encapsulated inside metallic or plastic enclosures with a metallic or plastic contact surface for installation on the inside (dry side) of the submerged object surface in an array configuration. Within this array the two or more transducers are installed on the submerged surface at precise distances from each other and are arranged to vibrate synchronously to generate guided wave mode, such as antisymmetric guided wave mode, in the target structure (e.g. the hull). The separation distance between two transducers is a precise function of the target structure (e.g. hull) material, target (e.g. hull) structure thickness and ultrasonic frequency while the placement is a function of the watercraft geometry. The same is true for the array(s) for both frequencies.

In certain embodiments, the resulting ultrasonic waves are non-abrasive and non-destructive to any coatings of the submerged surface, such as existing hull coating including corrosion coatings, antifouling coatings and other coatings. The ultrasonic vibrations of the guided wave type are focused on a membrane of the submerged surface of the target structure (e.g. hull membrane) and therefore significantly reduce energy leaks into the environment, rendering the system harmless for species living in the surrounding marine or aquatic environment.

According to certain aspects and embodiments of the present technology, marine deposits on large ship hull surfaces can be prevented, or layers of marine or aquatic fouling that have become bonded to the subsurface structures down to the biofilms can be destroyed, without destroying the integrity of the underlying hull structure/substrate.

In certain embodiments, the present technology is able to reduce the need for antifouling coatings that are only able to slow down the biofilm growth without preventing and/or eliminating it. Toxic antifouling coatings/paints incorporate copper, heavy metals and other biocides, which, when released due to ablation into surrounding marine or aquatic environments, pose an increasing danger to the local marine or aquatic life. Therefore, by reducing the need for antifouling coatings, the environmental impact is also reduced.

According to certain aspects and embodiments of the present technology, the prevention of fouling is performed using the principle of an ultrasonic vibration of a submerged surface such as a surface of a watercraft hull. To achieve extended surface treatment, guided wave ultrasound, such as antisymmetric guided wave, is used. Without being held to any theory, it is thought that continuous (or quasi-continuous) guided wave mode ultrasound excites the hull, travelling with very low power absorption throughout the hull. The deterring action by ultrasound against fouling is twofold. On one hand, the wave energy partially leaks into the water over the underwater surface of the hull, producing currents that discourage marine organisms from approaching the hull. On the other hand, macromolecules that would be responsible for forming initial fouling layers experience recoil forces due to the vibration of the hull when colliding with it, thus being discouraged from adhering to it. Moreover, the present technology can be equally effective regardless of whether the watercraft (or other target structure) is moving or stationary, which is a notable shortcoming of most currently available antifouling methods. While stationary, the effectiveness of conventional antifouling coatings is significantly compromised and mechanical cleaning is required at a higher frequency. In certain embodiments, the transducers are arranged to operate substantially continuously during a treatment period. The transducers are not arranged to operate in pulsed mode.

In certain embodiments of the present technology, large submerged structures can be protected from algae and other marine deposits by use of continuous guided wave ultrasound mode vibration, which may be antisymmetric, of a submerged surface with a parallel second frequency ultrasound wave that results in heterodyning which produces two additional frequencies out of the initial two frequencies. By combining guided wave ultrasound with the effect of heterodyning, the resulting structure can be vibrated not only with one single frequency, but with four distinct frequencies, thus permitting protection against a much wider range of marine fouling species. Each marine fouling species has its specific resonance frequency, on which it is particularly vulnerable against damage by ultrasonic impact. By quadrupling the number of frequencies used, embodiments of the present technology can protect against a much broader variety of species, as can be found throughout the world marine environment. The ultrasonic guided waves permit to protect large submerged structures due to reduced leakage of ultrasonic energy into the water, and thus a greatly enhanced effective range of the ultrasonic vibrations. As a result, in certain embodiments, biofilm and further biofouling on underwater structures is prevented, or existing biofouling, like biofilm algae, is destroyed and/or removed. Embodiments of the present technology can be applied to submerged surfaces of watercrafts such as hulls, propellers, rudders, inlet ports for cooling of nuclear submarines, outlet ports, sonar housings, protective grills and other structures that are submerged in salt or freshwater environments.

In accordance with one aspect of the present technology, there is provided an ultrasonic system for treating a submerged surface of a target structure. The system includes: an ultrasonic generator operable to generate electrical energy to drive first and second ultrasonic transducers, the electrical energy including at least two different frequencies including a first operation frequency and a second operation frequency; first ultrasonic transducers configured to be mounted as a first array to the target structure, and connectable to the ultrasonic generator and operable to generate a first ultrasound signal from the first operation frequency; and second ultrasonic transducers configured to be mounted as a second array to the target structure, and connectable to the ultrasonic generator and operable to generate a second ultrasound signal from the second operation frequency. Two or more ultrasonic transducers of any array are spaceable from one another to produce antisymmetric guided ultrasonic waveforms through the target structure including heterodyned frequencies from the first ultrasound signal and the second ultrasound signal. The first ultrasonic transducers of the first array and the second ultrasonic transducers of the second array are spaced from one another to produce the guided waveforms through the target structure. The first and/or second ultrasonic transducers may be arranged to operate substantially continuously within a treatment period. The first and/or second ultrasonic transducers may be arranged to operate simultaneously to one another.

In some embodiments, at least one of the first ultrasonic transducers and the second ultrasonic transducers comprise a piezoelectric ultrasonic transducer. In some embodiments, at least one of the first ultrasonic transducers and the second ultrasonic transducers is bonded to the target structure.

In some embodiments, at least one of the first ultrasonic transducers and the second ultrasonic transducers is connected to the target structure via an ultrasonic transfer media. In some embodiments, the ultrasonic transfer media is an epoxy material.

In some embodiments, the first ultrasonic transducers of the first array are electrically connected in parallel to the ultrasonic generator; and the second ultrasonic transducers of the second array are electrically connected in parallel to the ultrasonic generator.

In some embodiments, the first ultrasonic transducers are distanced from one another by a first distance approximately equivalent to half of a wavelength of the first operation frequency; and the second ultrasonic transducers are distanced from one another by a second distance approximately equivalent to half of a wavelength of the second operation frequency.

In some embodiments, one or both of the first distance and the second distance are multiples of half a wavelength of the first operation frequency. The multiples may be even or uneven.

In some embodiments, one or both of the first and second distances is a function of a material, frequency and a thickness of a wall defining the submerged surface.

In some embodiments, the first ultrasonic transducers of the first array and the second ultrasonic transducers of the second array are arranged in one or both of: an inline configuration whereby one or both of the first ultrasonic transducers and the second ultrasonic transducers are linearly aligned with one another; and a triangular configuration whereby adjacent ones of the first ultrasonic transducers or the second ultrasonic transducers are disposed diagonally across from one another.

In some embodiments, the first operation frequency is between about 20 and about 30 kHz inclusively.

In some embodiments, the second operation frequency is between about 30 and about 50 kHz inclusively.

In some embodiments, the first operation frequency and the second operation frequency are distinct from one another.

In some embodiments, the system also includes a controller for controlling characteristics of the signals generated by the ultrasonic generator. The controller may comprise a computer system having a processor.

In some embodiments, the characteristics of the signals controlled by the controller include at least one of an amplitude and a timing.

In some embodiments, one or more of a voltage and a control current of the ultrasonic generator is adjustable.

In some embodiments, the system also includes an alarm module configured to deploy an alert in response to failure of any one of the first ultrasonic transducers and the second ultrasonic transducers.

In some embodiments, the ultrasonic generator is operable to perform a frequency sweep to tune one or both of the first and second operation frequencies to first and second resonant frequencies of the first and second transducers, respectively. In certain embodiments, the frequency sweep is less than about 3 kHz. In certain other embodiments, the sweep is less than about 5 kHz.

In some embodiments, the target structure is a hull of a watercraft. In some embodiments, the target structure is an underwater static structure.

In some embodiments, the system is configured for one or more of: prevention or disruption of biofilm, and disruption or prevention of algae growth.

In accordance with another aspect of the present technology, there is provided a watercraft. The watercraft includes a hull and an ultrasonic system for treating a submerged surface of the hull. The system includes: an ultrasonic generator operable to generate electrical energy to drive first and second ultrasonic transducers, the electrical energy including at least two different frequencies including a first operation frequency and a second operation frequency; first ultrasonic transducers mounted as a first array to the hull, connectable to the ultrasonic generator and operable to generate a first ultrasound signal from the first operation frequency; and second ultrasonic transducers mounted as a second array to the hull, connectable to the ultrasonic generator and operable to generate a second ultrasound signal from the second operation frequency. The first ultrasonic transducers of the first array and the second ultrasonic transducers of the second array are spaced from one another to produce guided ultrasonic waveforms through the hull including heterodyned frequencies from the first ultrasound signal and the second ultrasound signal. The ultrasonic waveforms may be antisymmetric.

In some embodiments, at least one of the first ultrasonic transducers and the second ultrasonic transducers comprise a piezoelectric ultrasonic transducer.

In some embodiments, at least one of the first ultrasonic transducers and the second ultrasonic transducers is bonded to the hull.

In some embodiments, at least one of the first ultrasonic transducers and the second ultrasonic transducers is connected to the hull via an ultrasonic transfer media. In some embodiments, the ultrasonic transfer media is an epoxy material.

In some embodiments, the first ultrasonic transducers of the first array are electrically connected in parallel to the ultrasonic generator and the second ultrasonic transducers of the second array are electrically connected in parallel to the ultrasonic generator.

In some embodiments, the first ultrasonic transducers are distanced from one another by a first distance approximately equivalent to half of a wavelength of the first operation frequency; and the second ultrasonic transducers are distanced from one another by a second distance approximately equivalent to half of a wavelength of the second operation frequency.

In some embodiments, each of the first and second distances is a function of a material, frequency and a thickness of a wall defining the submerged surface.

In some embodiments, the first ultrasonic transducers of the first array and the second ultrasonic transducers of the second array are arranged in one or both of: an inline configuration whereby one or both of the first ultrasonic transducers and the second ultrasonic transducers are linearly aligned with one another; and a triangular configuration whereby adjacent ones of the first ultrasonic transducers or the second ultrasonic transducers are disposed diagonally across from one another.

In some embodiments, the first operation frequency is between about 20 and about 30 kHz inclusively. In some embodiments, the second operation frequency is between about 30 and about 50 kHz inclusively.

In some embodiments, the first operation frequency and the second operation frequency are distinct or different from one another.

In some embodiments, the system also includes a controller for controlling characteristics of the signals generated by the ultrasonic generator.

In some embodiments, the characteristics of the signals controlled by the controller include at least one of an amplitude and a timing.

In some embodiments, a power generated by the ultrasonic generator is adjustable.

In some embodiments, the system also includes an alarm module configured to deploy an alert in response to failure of any one of the first ultrasonic transducers and the second ultrasonic transducers.

In some embodiments, the ultrasonic generator is operable to perform a frequency sweep of at least one of the first and second operation frequencies to tune at least one of first and second resonant frequencies of the first and second transducers, respectively.

In some embodiments, the frequency sweep comprises transmitting electrical signals about a resonant frequency of at least one of the first ultrasonic transducers or the second ultrasonic transducers.

According to another aspect of the present technology, there is provided a method for ultrasonically treating a submerged surface of a target structure. The method includes: transmitting electrical signals at a first operation frequency and a second operation frequency to a first array of first ultrasonic transducers and a second array of second ultrasonic transducers respectively, the first ultrasonic transducers and the second ultrasonic transducers being mounted to the target structure; and allowing the first transducers to generate a first ultrasound signal from the first operation frequency, and the second transducers to generate a second ultrasound signal from the second operation frequency, such that a heterodyned signal is generated from the first and second ultrasound signals for propagation through the target structure.

In some embodiments, the electrical signals are transmitted continuously and simultaneously during a treatment interval.

In some embodiments, the method also includes, prior to transmitting the electrical signals, performing a frequency sweep of at least one of the first and second operation frequencies to tune the at least one of the first and second operating frequencies to at least one of the first and second resonant frequencies.

In some embodiments, the frequency sweep includes transmitting electrical signals with a frequency variation range of less than about 5 kHz, or less than about 3 kHz.

In some embodiments, the first ultrasonic transducers are distanced from one another by a first distance approximately equivalent to half of a wavelength, or its multiples thereof, of the first operation frequency; and/or the second ultrasonic transducers are distanced from one another by a second distance approximately equivalent to half of a wavelength, or its multiples thereof, of the second operation frequency. The multiples may be even or uneven multiples.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

Further aspects and advantages of the present technology will become better understood with reference to the description in association with the following in which.

Skilled persons will appreciate that elements in the figures are illustrated for simplicity and clarity and have not necessarily been drawn to scale. For example, the dimensions of some of the elements in the figures may be exaggerated relative to other elements to help to improve understanding of embodiments of the present technology.

The apparatus and system components have been represented where appropriate by conventional symbols in the drawings, showing only those specific details that are pertinent to understanding the embodiments of the present technology so as not to obscure the disclosure with details that will be readily apparent to those of ordinary skill in the art having the benefit of the description herein.

DETAILED DESCRIPTION

Detailed descriptions of the preferred embodiments are provided herein. It is to be understood, however, that the present technology may be embodied in various forms. Therefore, specific details disclosed herein are not to be interpreted as limiting, but rather as a basis for the claims and as a representative basis for teaching one skilled in the art to employ the present technology in virtually any appropriately detailed system, structure or manner.

Embodiments of the present technology will be described with reference to the accompanying figures, wherein like numbers represent like elements throughout. Further, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. The terms "connected", and "coupled" are used broadly and encompass both direct and indirect mounting, connecting and coupling. Further, "connected" and "coupled" are not restricted to physical or mechanical connections or couplings.

Embodiments of the present technology summarized below and defined by the claims are better understood by referring to the following detailed description, which should be read in conjunction with the accompanying figures. The detailed description of the particular embodiments is set out to enable one to practice the present technology, it is not intended to limit the claims, but to serve as a particular example thereof. Also, the list of embodiments presented in this patent is not exhaustive and for those skilled in the art, new embodiments can be realized.

There is provided ultrasonic systems for treating a submerged surface of a target structure. The target structures can include watercrafts such as a ship or a boat, a canal, oil rig legs, bridge legs, support legs, and other structures having at least a portion that is submerged in water.

Figure 1:
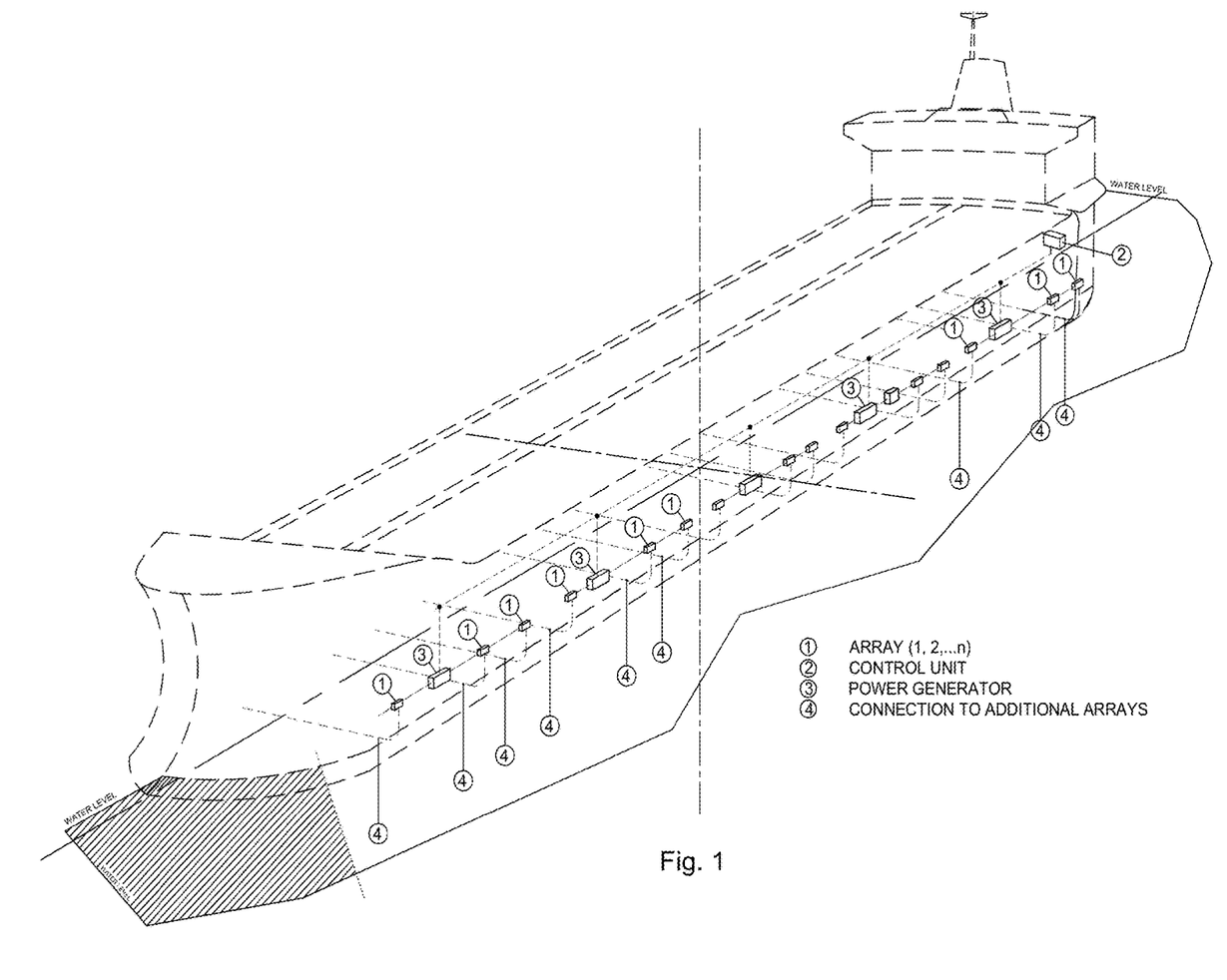
FIG. 1 illustrates an ultrasonic system installed on a watercraft, according to certain embodiments of the present technology.

With reference to FIG. 1, an ultrasonic system 10 is shown installed on a target structure 12. In this embodiment, the target structure 12 is a hull of a watercraft 100. The water may be any kind of water such as salt water (e.g. seas and oceans), fresh water, wastewater and the like. The ultrasonic system 10 can be considered as cleaning or grooming modules for the removal of organism layers from the submerged surface of the hull 12. The organism layer can be algae or any other type of biological growth. The cleaning or grooming includes the removal of a biofilm layer ("grooming") that supports the organism growth. In certain embodiments, the cleaning module will remove both organisms and biofilm, or prevent the growth of one or both of organisms and biofilm.

The ultrasonic system 10 includes a plurality of arrays 1 spaced across the length of the watercraft 100. The arrays 1 are separated by twice the effective range of a single array 1 under the consideration of actual design and operating conditions. Each array 1 has at least first and second ultrasonic transducers of substantially the same resonant frequency (i.e., the resonant frequency of each of the ultrasonic transducers of a given array 1 is substantially the same). The system 10 also includes a plurality of power generators 3 which supply the electrical ultrasound signals while controlling adjacent arrays 1. In this embodiment, the generators 3 are connected to an optional central control unit 2 installed on the watercraft 100. The optional central control unit 2 is configured for the detection and management of conditions and reporting to central ship control of the watercraft 100. Each generator 3 is connected to a selected number of the arrays 1 and is operable to generate electrical energy to drive the ultrasonic transducers of the arrays 1 to which that generator 3 is connected. The arrays 1 can be connected to additional arrays via connections 4 which extend across the width of the watercraft 100 (or other structure).

Figure 2:
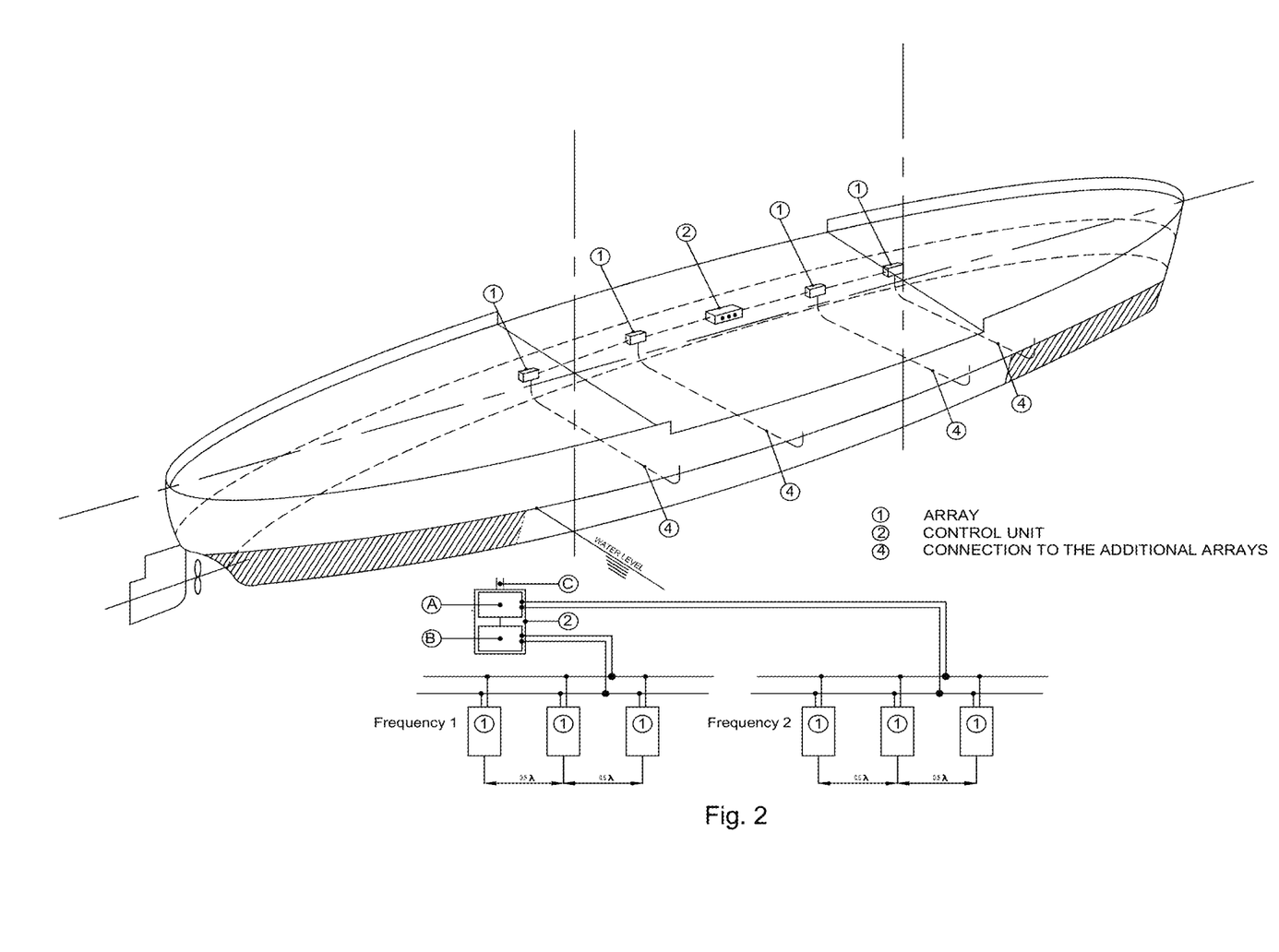
FIG. 2 illustrates another embodiment of the ultrasonic system installed on another watercraft, including an electrical wiring arrangement thereof.

FIG. 2 shows another embodiment in which the ultrasonic system 10 is installed on a watercraft 100. In the system 10 of FIG. 2, the generator 3 has two or more frequency outputs to supply the electrical ultrasound signals to the arrays 1. More specifically, the generator 3 has a first frequency generator A and a second frequency generator B which generate ultrasound signals at distinct frequencies. Power is supplied to the generator 3 by a standard power supply C. As can be seen from the electrical wiring arrangement of the system 10, one of the arrays 1 operates at a first frequency (Frequency 1) and another of the arrays 1 operates at a second frequency (Frequency n) and are thus accordingly supplied by respective ones of the first and second frequency generators A, B.

Figure 3:
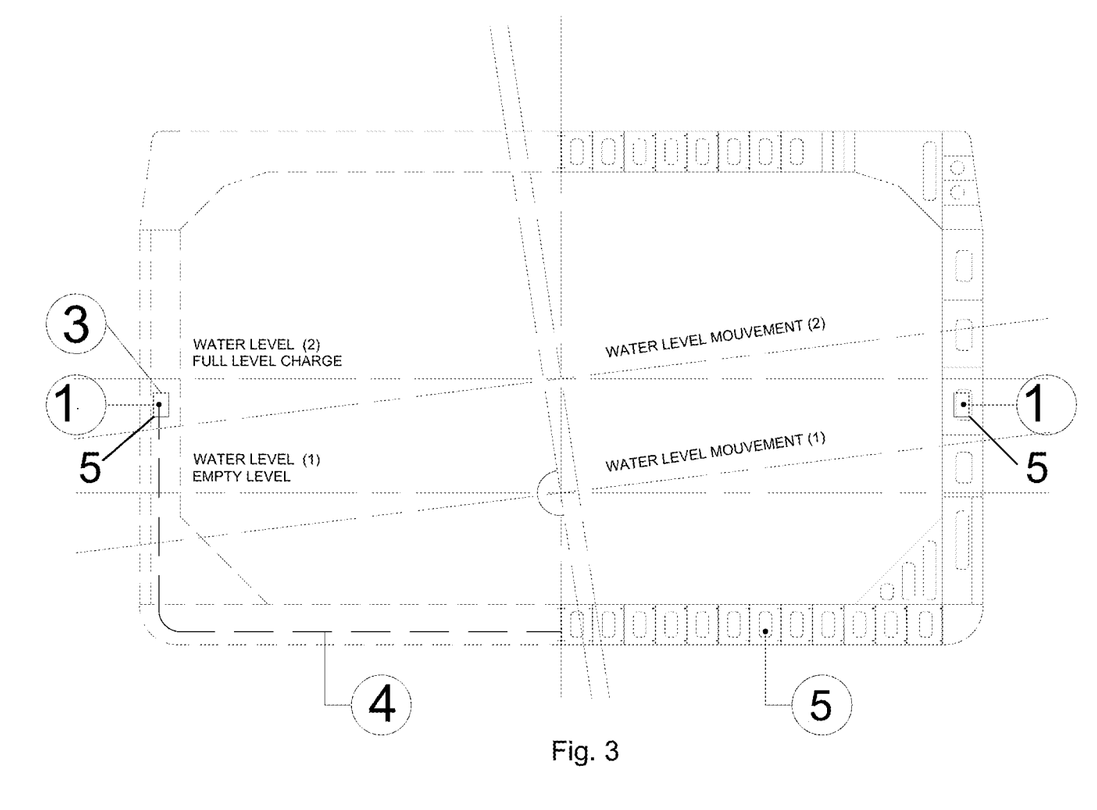
FIG. 3 illustrates a part of the ultrasonic system on a watercraft under varying loading and design operating conditions, according to certain embodiments of the present technology.

In certain embodiments, as shown in FIG. 3, ultrasound transducers 5 of one or more of the arrays 1 are positioned below the lowest possible waterline. Depending on operating conditions and watercraft design, in certain embodiments, some ultrasound transducers 5 are positioned above the lowest water level, while remaining below the highest water level. In certain embodiments, the ultrasonic system will clean, prevent deposition or groom a water vessel such as a marine vessel hull. This may include the removal of the biofilm layer (grooming) that supports the organism growth (cleaning module will remove both organisms and biofilm). Certain embodiments of the system of the present technology comprise three elements: an ultrasonic generator with two outputs (one from each of the first and second frequency generators A, B), a first array of first ultrasonic transducers 1, and a second array of second ultrasonic transducers 1'. Each array comprises transducers having substantially the same or similar resonant frequencies. Each transducer may comprise an encapsulated piezoelectric ultrasound transducer. Each of the first and second arrays is installed on a submerged surface of the hull 12. In certain embodiments, the complete system 10 thus comprises a minimum of one two-frequency generator 3 and a minimum of two transducer arrays 1, 1', each containing a minimum of two identical transducer units 5. The system 10 may also include a power amplifier 6 (shown in FIG. 5).

Figure 4:
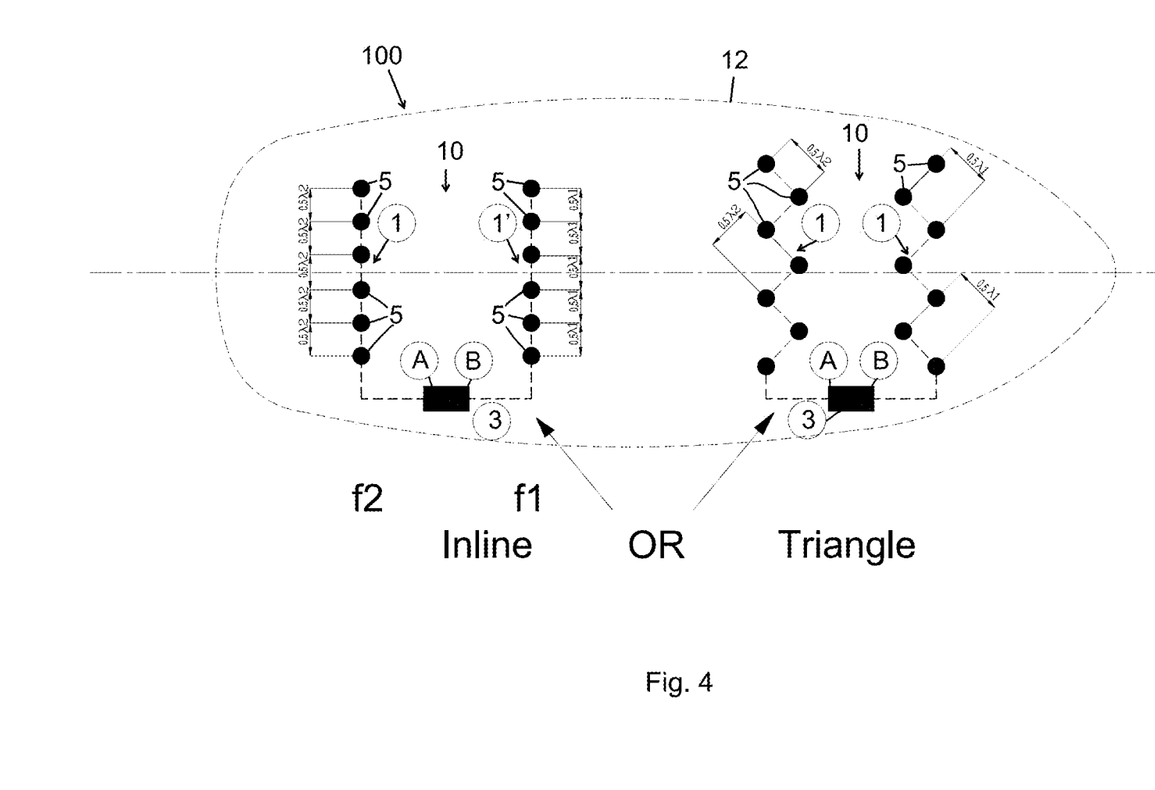
FIG. 4 illustrates a two-frequency example application of the ultrasonic system, with an inline configuration (left hand side) and a triangular configuration (right hand side) of an array of ultrasonic transducers according to certain embodiments of the present technology.

As can be seen in FIG. 4, the arrays 1, 1' can have an inline configuration or a triangular configuration. In the inline configuration of the arrays 1, 1', the ultrasonic transducers 5 of a given one of the arrays 1, 1' are linearly aligned with one another thus forming a line. On the other hand, in the triangular configuration of the arrays 1, 1', adjacent ones of the ultrasonic transducers of a given one of the arrays 1, 1' are disposed diagonally across from one another.

Each transducer 5 (also referred to as a transducer unit) contains an ultrasonic piezo electric ultrasound transducer attached to the contact surface (shown in FIGS. 1 and 2) and electrically connected to the electronic ultrasound power generator 3. The general construction of a transducer unit 5 consists of the piezoelectric ultrasonic transducer device, encapsulated in a metallic or plastic enclosure, bonded on one side to the contact surface of the same or different material, and sealed on the other side. There may be provided a cover for sealing transducer device. Each transducer unit 5 within an array 1, 1' of two or more transducer units 5 is electrically connected in parallel to the ultrasonic power generator 3. The contact surface is the surface where the mechanical vibration energy generated by the transducer unit 5 will be transferred into the object itself.

The present technology, in certain embodiments, further provides different energy transfer mechanisms to optimize guiding the mechanical vibration energy generated by the piezoelectric transducer into the object surface. This transfer can be achieved by different means, including but not limited to epoxy or similar bonding, or by a free contact. Non-bonded contact is assured by an adapter device firmly holding the transducer assembly in place to assure energy transfer directly or through a coupling media into the object.

The potential size of the effective cleaning or grooming target area is determined by the level of energy applied to each transducer unit 5, the amount of transducers 5 in the arrays 1, 1', the location of an array within a vessel or object surface, the accuracy of the array geometry and the level of contamination at a given geographic location.

In its preferred embodiment, two or more distinct frequency arrays 1, 1' are powered by a multi-frequency generator 3 (having two or more frequencies) to produce guided wave mode ultrasound waves throughout the entire structure of the submerged object in order to achieve an enhanced effective range of the ultrasound vibration.

In certain embodiments, the enhanced reach of guided wave ultrasound allows protecting an entire ship 100 or object with few arrays 1 and with minimal hardware. Reduced deposits on the hull 12 can reduce/eliminate increased friction and increased fuel consumption as well as pollution of air and water.

Figure 5:
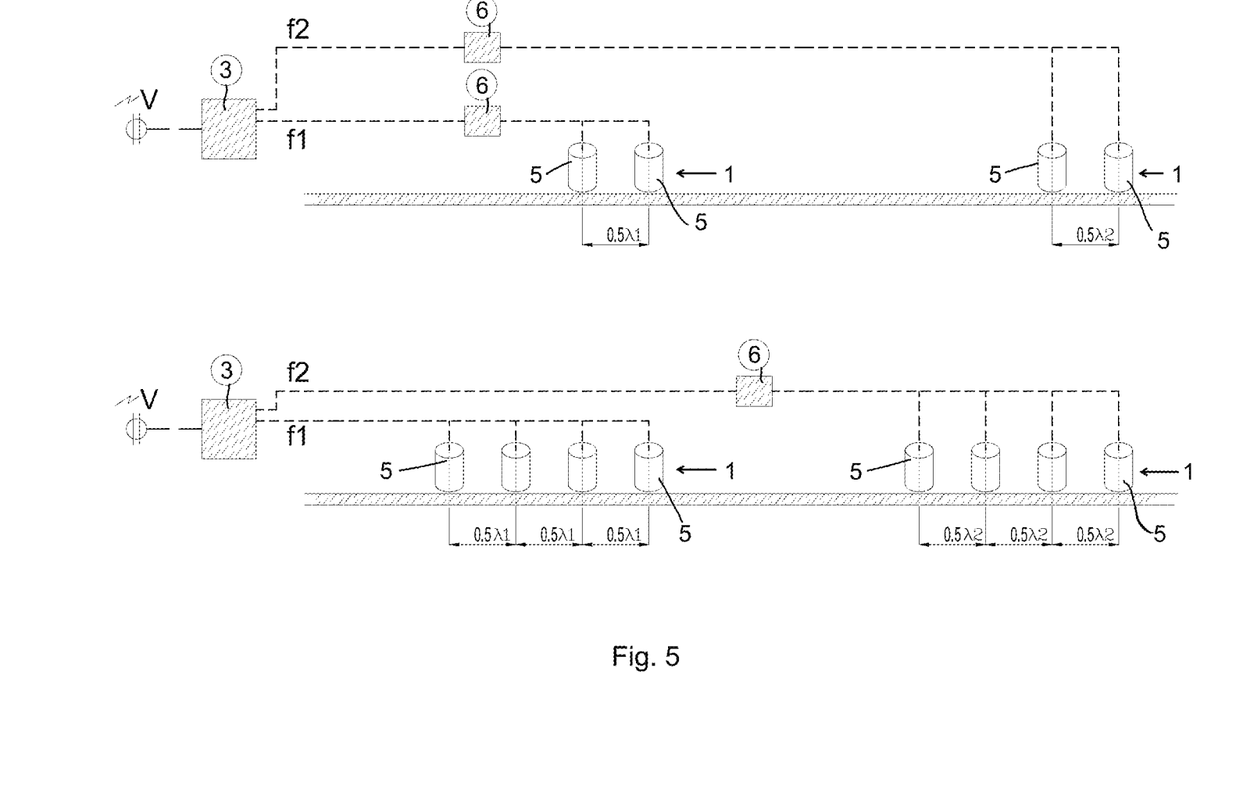
FIG. 5 illustrates various configurations of ultrasonic transducers, generators and power amplifiers according to certain embodiments of the present technology.

The creation of guided waves in itself is achieved by exciting two or more transducers 5 simultaneously, continuously and in parallel, on the same surface, separated by their half-wave-length or multiples thereof (as shown in FIGS. 2, 4 and 5). Enhanced energy efficiency is achieved this way, by diverting energy that is typically wasted into the adjacent water body (bulk mode), into the membrane, for example a ship hull 12, with the result of obtaining effective vibration for much greater distances and thus protecting or treating much greater surfaces against algae than previously possible.

In certain embodiments, heterodyning is achieved by the emission of two or more distinct, continuous frequencies by two or more distinct, emitting piezoelectric transducers. Parallel and simultaneous emission of two or more frequencies in a media results in the multiplication of frequencies, namely all their totals and all their differential frequencies too. As an example, the heterodyning of two frequencies leads to the emission of actually four frequencies. As each algae type is highly vulnerable to a specific frequency, the emission of a broad frequency spectrum significantly enhances treatment efficacy.

The combination of guided-waves and heterodyning provides an unexpected synergistic effect. Higher frequency waves are carried over greater distances than otherwise possible by superposing the higher frequencies onto the more energetically powerful, lower frequency waves. In short, guided waves, in certain embodiments, provide more energy efficient algae treatment, while heterodyning generates a broad spectrum treatment of algae species. With their synergetic combination they are capable of treating more species, on greater surfaces (example longer ships), more energy efficiently, with reduced fuel cost and environmentally damaging emissions.

In certain embodiments, the guided wave mode for the ultrasound waves is achieved by separating the two or more transducers 5 by a half a wave length λ. This actual distance is a function of frequency, plate thickness, material properties, and optionally other parameters.

By observing the transducer unit separation (or multiples thereof) within each array 1, calculated by a formula, the two or more ultrasonic transducer units 5 achieve vibration waves that are exactly superposed and thus enhance each other's amplitude, thus resulting in a guided wave form.

In certain embodiments, the same or similar result may be achieved by empirical determination of the transducer unit separation. After installing one fixed transducer unit 5 on the hull 12, a second transducer unit 5 is kept mobile (not fixed to the surface of the hull 12). A third passive transducer unit 5 will be positioned for example at approximately 1 m from the first transducer unit 5 and connected to an oscilloscope. Next, both transducer units 5 will be energized with the identical synchronous ultrasound signal originating from the ultrasonic power generator 3. Observing the oscilloscope amplitude, the second transducer unit 5 will then be slowly moved around closer and further from the fixed transducer unit 5, and the amplitude of the oscilloscope will be observed. At the highest amplitude possible by moving the second transducer unit 5 on the object surface, the second transducer unit 5 will be stopped and the exact distance between the transducer units 5 will be noted. This distance is the distance necessary to achieve guided wave mode in the given setup. Different array configurations are shown in FIG. 4, but not limited to them. An array may be a line-array or a triangular array, as depicted. Depending, for example on a ship design, the installation of transducers in a line across the ship 100 may be more practical, while on another application more energy needs to be applied on a smaller space, which is possible with a triangular layout. Any array 1 however comprises two or more transducers 5. The number of transducers 5 is determined by the size of the object 100, design of the object 100, operating conditions, special requirements and environmental conditions. FIG. 5 shows two arrangements of the transducers 5, generator 3 and power amplifier 6. Other arrangements are possible and within the scope of the present technology. For example, depending on the design of the object 100, the algae contamination encountered, the operating type for example a vessel, and other factors, one or more generators 3 may be used for complete coverage. It is also possible to have a central control unit 2, with decentralized power generators 3, connected by a bus system or similar types of link.

Within each frequency array 1, and within a given treatment time, the ultrasonic transducers units 5 operate continuously, uninterrupted, and in parallel to each other in order to achieve the necessary wave form that is essential for the protection and/or destruction of marine deposits on the water side of the structure.

The actual power level transmitted by the ultrasonic tone generator 3 shall be adjustable to enable optimal power settings for different situations, applications, marine environments, operating conditions. The ultrasonic power output capacity of the ultrasound tone generator 3 shall be sufficient to provide the total power level of all transducers 5 within the array 1 powered by it.

For situations with low levels of contamination, it is possible to operate the embodiments of the present technology intermittently and/or below maximum power settings. The timing and power levels may be adjustable on the ultrasonic tone generator 3.

The frequencies selected for the two or more arrays 1 are dependent on the type of contamination present in the marine environment. Some effective frequencies have been found, but not limited to, the use of a low ultrasonic frequency above 20 kHz and a higher frequency for example around 40 kHz. The frequencies emitted by the ultrasonic tone generator 3 must be tuned to match the resonance frequencies of the transducer units 5 used within each array 1. A limited frequency sweep may be used to enhance the effectiveness.

EXAMPLES

The following examples are illustrative of the wide range of applicability of the present technology and are not intended to limit its scope. Modifications and variations can be made therein without departing from the scope of the technology. Although any method and material similar or equivalent to those described herein can be used in the practice for testing of the present technology, the preferred methods and materials are described.

Example 1

Figure 6:
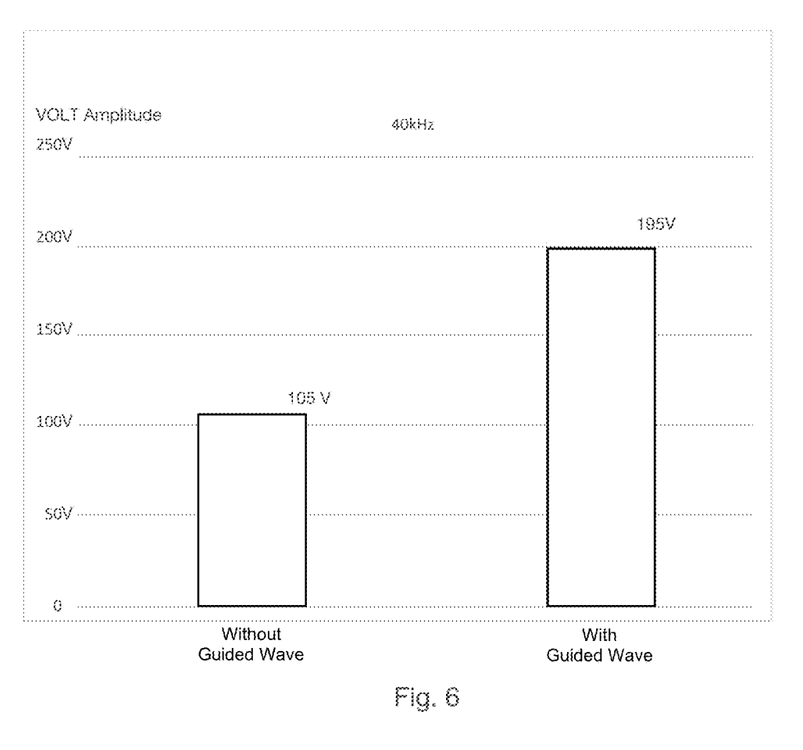
FIG. 6 illustrates voltages achieved with and without a guided wave system and method, according to certain embodiments of the present technology (Example 1).

On a mild steel plate two continuously active (transmitting) 50 W transducers 5 were installed and connected to a 40 kHz generator 3. On the same steel plate, at a fixed location approximately 1 metre distance from the transducers 5, a passive (detecting) transducer was installed and connected to a Fluke oscilloscope. For the first measurement, the two active transducers 5 were positioned for bulk transmission, at a non-guided-wave inducing distance, transmitting at 50 W each. The measurement was taken using the oscilloscope. For the second measurement the two transducers 5 were moved to a position of maximum amplitude, being an anti-symmetric guided-wave-inducing position, according to certain embodiments of the present technology. The amplitude was measured in the same manner as in the earlier measurement. FIG. 6 shows that with guided wave, a higher voltage for the same amplitude could be achieved.

Example 2

Figure 7:
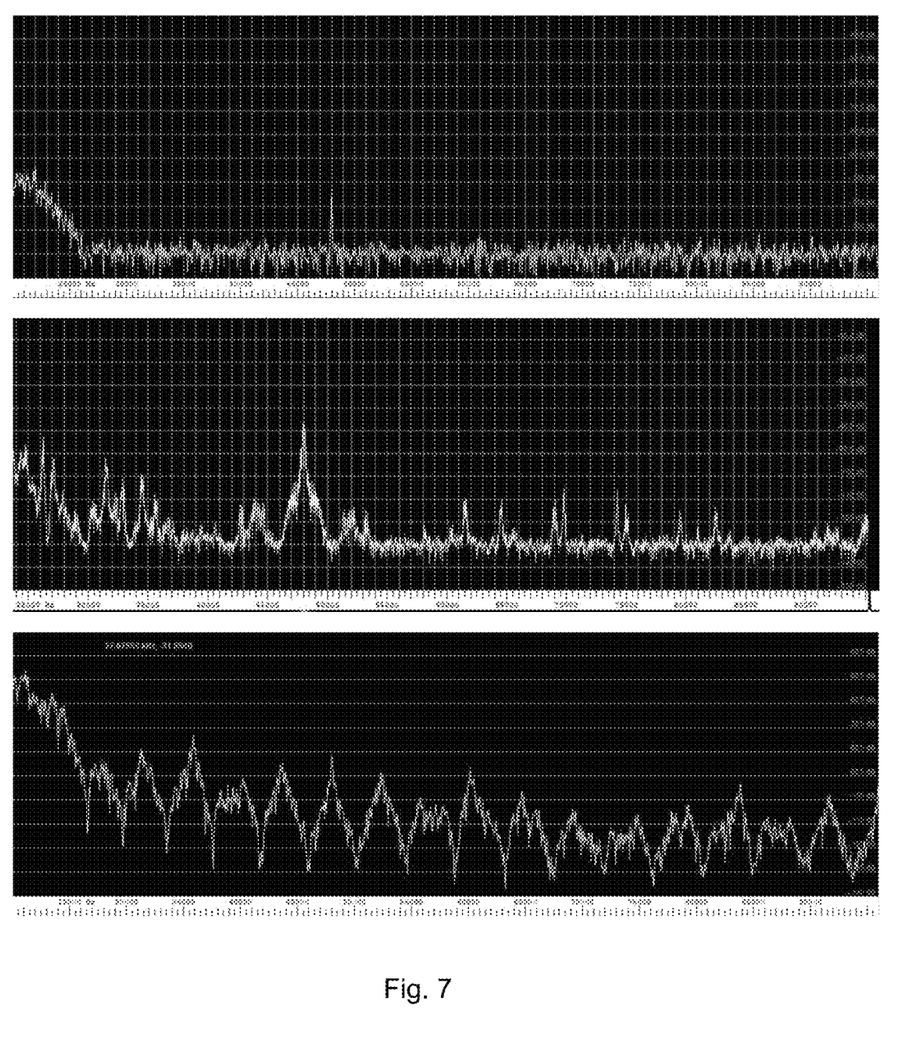
FIG. 7 illustrates emitted frequency spectrums of transducers in low frequency, high frequency and heterodyned conditions, according to certain embodiments of the present technology (Example 2).

Background noise frequency emission in open water was measured using a hydrophone (top spectra of FIG. 7). This was compared to the frequency spectrum of a prior art transducer unit (middle spectra of FIG. 7). The prior art transducer comprised a single transducer arranged to emit a single frequency, low power, pulsed signal. In the bottom spectrum of FIG. 7, the frequency emission of two transducers in heterodyned conditions are illustrated, according to a component of the present technology. The transducers were oriented in the same direction to achieve superposition. Both transducers were operated continuously and simultaneously at a power setting of about 30 W for each transducer. It can be seen that the emitted frequency spectrum is significantly enlarged, and enhanced compared to the prior art.

Example 3

A system according to an embodiment of the present technology was set up on a hull of a 65 foot sailboat. The system comprised two sets of transducers, each set comprising two transducers, and the transducers of the different sets having distinct frequencies. The transducers were operated continuously within a treatment time of 2 months. During that time, algae growth was prevented on the hull of the sailboat. After that, the system was not operated for one month whilst the sailboat was in port. During the period of no operation, algae growth formed on the sailboat resulting in the sailboat being unable to reach hull speed due to added friction from the algae growth deposited during the month without protection. Following three days operation of the system whilst the sailboat was in port, algae was killed allowing the sailboat to reach hull speed after the dead algae were ablated during the water motion during the boat movement. Live algae maintain adherence to a hull surface even with water motion, while dead algae lose their adherence and are easily scrubbed by water current (not while stationary however).

While specific embodiments have been shown and described, many variations are possible. It should be appreciated that the invention is not limited to the particular embodiments described and illustrated herein but includes all modifications and variations falling within the scope of the invention as defined in the appended claims.

What is claimed is:

1. An ultrasonic system for treating a submerged surface of a target structure, the system comprising:
   at least one ultrasonic generator operable to generate electrical energy to drive at least two ultrasonic transducers, the electrical energy comprising at least two different frequencies including a first operation frequency and a second operation frequency;
   the at least two ultrasonic transducers configured to be mounted to the target structure and comprising:
      a first ultrasonic transducer configured to generate a first ultrasound signal from the first operation frequency; and
      a second ultrasonic transducer configured to generate a second ultrasound signal, different to the first ultrasound signal, from the second operation frequency;
   wherein the at least one ultrasonic generator is configured to cause the first and second ultrasonic transducers to generate the first and second ultrasound signals substantially simultaneously in order to produce heterodyned frequencies from the first ultrasound signal and the second ultrasound signal, and wherein at least one of the first ultrasonic transducer and the second ultrasonic transducer is connected to the target structure via an ultrasonic transfer media.

2. The system of claim 1, wherein the at least one ultrasonic generator is configured to cause the first and second ultrasonic transducers to generate the first and second ultrasound signals substantially continuously during a treatment interval.

3. The system of claim 1, wherein at least one of the first ultrasonic transducer and the second ultrasonic transducer comprises a piezoelectric ultrasonic transducer.

4. The system of claim 1, wherein at least one of the first ultrasonic transducer and the second ultrasonic transducer are bonded to the target structure.

5. The system of claim 1, wherein:
   the at least one ultrasonic generator comprises a single ultrasonic generator which is configured to drive the first ultrasonic transducer and the second ultrasonic transducer.

6. The system of claim 1, wherein:
   the at least one ultrasonic generator comprises a first ultrasonic generator which is configured to drive the first ultrasonic transducer, and a second ultrasonic generator which is configured to drive the second ultrasonic transducer.

7. The system of claim 1, wherein the first ultrasound signal has a relatively lower frequency than the second ultrasound signal.

8. The system of claim 1, wherein the first operation frequency is between about 20 and about 30 kHz inclusively, and the second operation frequency is between about 30 and about 50 kHz inclusively.

9. The system of claim 1, wherein the at least one ultrasonic generator is operable to perform a frequency sweep to tune one or both of the first and second operation frequencies to first and second resonant frequencies of one of the at least two ultrasonic transducers.

10. An underwater structure, comprising:
    a target surface susceptible to underwater fouling; and
    at least one ultrasonic generator operable to generate electrical energy to drive at least two ultrasonic transducers, the electrical energy comprising at least two different frequencies including a first operation frequency and a second operation frequency;
    the at least two ultrasonic transducers configured to be mounted to the underwater structure and comprising:
       a first ultrasonic transducer configured to generate a first ultrasound signal from the first operation frequency; and
       a second ultrasonic transducer configured to generate a second ultrasound signal, different to the first ultrasound signal, from the second operation frequency;
    wherein the at least one ultrasonic generator is configured to cause the first and second ultrasonic transducers to generate the first and second ultrasound signals substantially simultaneously in order to produce heterodyned frequencies from the first ultrasound signal and the second ultrasound signal, and wherein at least one of the first ultrasonic transducer and the second ultrasonic transducer is connected to the underwater structure via an ultrasonic transfer media.

11. The underwater structure of claim 10, wherein the at least one ultrasonic generator is configured to cause the first and second ultrasonic transducers to generate the first and second ultrasound signals substantially continuously during a treatment interval.

12. The underwater structure of claim 10, wherein:
the at least one ultrasonic generator comprises a single ultrasonic generator which is configured to drive the first ultrasonic transducer and the second ultrasonic transducer.

13. The underwater structure of claim 10, wherein:
the at least one ultrasonic generator comprises a first ultrasonic generator which is configured to drive the first ultrasonic transducer, and a second ultrasonic generator which is configured to drive the second ultrasonic transducer.

14. The underwater structure of claim 10, wherein the first ultrasound signal has a relatively lower frequency than the second ultrasound signal.

15. The underwater structure of claim 10, further comprising an alarm module configured to deploy an alert in response to failure of the first ultrasonic transducer or the second ultrasonic transducer.

16. The underwater structure of claim 10, wherein the at least one ultrasonic generator is operable to perform a frequency sweep to tune one or both of the first and second operation frequencies to first and second resonant frequencies of the first ultrasonic transducer and the second ultrasonic transducer, respectively, and wherein the frequency sweep comprises transmitting electrical signals about a resonant frequency of the first ultrasonic transducer or the second ultrasonic transducer.

17. A method for ultrasonically treating a submerged surface of a target structure, the method comprising:
transmitting electrical signals at a first operation frequency and a second operation frequency to at least one ultrasonic transducer which is mounted to the submerged surface of the target structure by an ultrasonic transfer media,
wherein the electrical signals cause the at least one ultrasonic transducer to generate a first ultrasound signal from the first operation frequency, and a second ultrasound signal from the second operation frequency, the first and second ultrasound signals being different from one another, and wherein the transmitting of the electrical signals is configured such that the first and second ultrasound signals are generated substantially simultaneously such that a heterodyned signal is generated from the first and second ultrasound signals for propagation through the target structure.

18. The method of claim 17, wherein the electrical signals are transmitted continuously during a treatment interval.

19. The method of claim 17, wherein transmitting the electrical signals comprises generating electrical signals such that the first ultrasound signal produced has a relatively lower frequency than the second ultrasound signal.

* * * * *